(12) United States Patent
Fleck

(10) Patent No.: US 8,382,210 B1
(45) Date of Patent: Feb. 26, 2013

(54) WHEEL COVER WITH WINDOW FOR OVER-THE-ROAD TRUCKS, TRAILERS AND THE LIKE

(76) Inventor: Jonathan E. Fleck, White Bear Lake, MN (US)

( * ) Notice: Subject to any disclaimer, the term of this patent is extended or adjusted under 35 U.S.C. 154(b) by 0 days.

(21) Appl. No.: 12/365,890

(22) Filed: Feb. 4, 2009

Related U.S. Application Data

(63) Continuation-in-part of application No. PCT/US2007/078155, filed on Sep. 11, 2007.

(60) Provisional application No. 61/026,017, filed on Feb. 4, 2008, provisional application No. 60/843,726, filed on Sep. 11, 2006.

(51) Int. Cl.
*B60B 7/04* (2006.01)
*B60B 7/12* (2006.01)

(52) U.S. Cl. ............ 301/37.102; 301/37.32; 301/37.36; 301/37.109

(58) Field of Classification Search ............ 301/37.101, 301/37.28, 37.102, 37.41, 37.32, 37.33, 37.35, 301/37.36, 37.109, 37.25; 40/587; 224/42.2; 206/304.1
See application file for complete search history.

(56) References Cited

U.S. PATENT DOCUMENTS

| | | | |
|---|---|---|---|
| 1,186,073 A | 6/1916 | Brown | |
| D49,555 S | 8/1916 | Vivaudou | |
| 1,503,397 A | 10/1923 | Wacker | |
| 1,616,155 A | 2/1927 | Uebelmesser | |
| 1,832,605 A * | 11/1931 | Zallio | 40/587 |
| 1,854,861 A * | 4/1932 | Reeves | 40/587 |
| D97,231 S | 10/1935 | Jackson | |
| D118,499 S | 1/1940 | Kraeft | |
| 2,550,222 A | 4/1951 | Carlin | |
| 2,614,001 A | 10/1952 | Rycroft | |
| 2,631,895 A | 3/1953 | Hunt | |
| 2,903,300 A | 9/1959 | Hurd | |
| 2,996,337 A | 8/1961 | Hurd | |
| 3,010,764 A | 11/1961 | Hurd | |
| 3,145,058 A | 8/1964 | Demrick et al. | |
| 3,317,247 A | 5/1967 | Lamme | |
| 3,322,468 A | 5/1967 | Spisak | |
| 3,410,436 A | 11/1968 | Foss et al. | |
| 3,480,329 A | 11/1969 | Foster et al. | |
| 3,512,840 A | 5/1970 | Foster et al. | |
| 3,532,385 A | 10/1970 | Foster et al. | |
| 3,724,906 A | 4/1973 | McCarroll | |
| 3,918,763 A | 11/1975 | Harris | |
| 4,214,683 A * | 7/1980 | Wills et al. | 224/42.2 |
| 4,241,954 A | 12/1980 | Brown | |
| 4,290,619 A | 9/1981 | Goodall | |

(Continued)

FOREIGN PATENT DOCUMENTS

| | | |
|---|---|---|
| CN | 2551488 Y | 5/2003 |
| DE | 104454 | 5/1923 |

(Continued)

OTHER PUBLICATIONS

U.S. Appl. No. 29/365,565, filed Jul. 11, 2010, Fleck.

(Continued)

*Primary Examiner* — Kip T Kotter
(74) *Attorney, Agent, or Firm* — Polsinelli Shughart PC

(57) ABSTRACT

A wheel cover assembly which includes a generally flat, circular wheel cover portion, an attachment assembly, and a manually releasable fastener selectively connecting the wheel cover portion to the attachment assembly, the wheel cover being predominately made from flexible laminar materials, the wheel cover portion comprising a mostly transparent window affixed to the manually releasable fastener, the window having an inwardly facing face which includes a flap for retaining a display card on the inside surface of the window.

20 Claims, 10 Drawing Sheets

U.S. PATENT DOCUMENTS

| | | | |
|---|---|---|---|
| 4,291,921 A | 9/1981 | Wulf | |
| 4,436,319 A | 3/1984 | Clutter | |
| 4,445,700 A | 5/1984 | Schroeder | |
| D286,028 S | 10/1986 | DiFede | |
| 4,620,749 A | 11/1986 | McEachern | |
| 4,706,981 A | 11/1987 | Dorwart | |
| 4,793,658 A | 12/1988 | Brown | |
| D303,648 S | 9/1989 | Clark | |
| D309,564 S | 7/1990 | Rayner | |
| D321,137 S | 10/1991 | Hofmann et al. | |
| 5,135,289 A | 8/1992 | Fleck et al. | |
| 5,167,440 A | 12/1992 | FitzGerald | |
| 5,316,376 A | 5/1994 | Defreitas | |
| D353,768 S | 12/1994 | Hayes | |
| D376,567 S | 12/1996 | Davidson et al. | |
| D387,725 S | 12/1997 | Cochran et al. | |
| D390,461 S | 2/1998 | Piselli | |
| D405,041 S | 2/1999 | Bidwell et al. | |
| 5,897,172 A | 4/1999 | Jarrell | |
| 5,931,543 A * | 8/1999 | Smith | 301/37.28 |
| 5,996,863 A * | 12/1999 | Burke | 224/42.2 |
| 6,116,415 A * | 9/2000 | Rastelli | 206/304.1 |
| D434,714 S | 12/2000 | White | |
| D489,611 S | 5/2004 | Monsanty | |
| D489,654 S | 5/2004 | Carter | |
| D492,596 S | 7/2004 | Miceli et al. | |
| 6,783,189 B1 | 8/2004 | Russell et al. | |
| D526,608 S | 8/2006 | Hayashi | |
| D532,691 S | 11/2006 | Vogel | |
| D534,844 S | 1/2007 | Eskandry | |
| D545,106 S | 6/2007 | Hourihan | |
| 7,246,860 B1 | 7/2007 | Seitz | |
| D560,153 S | 1/2008 | Zane | |
| D573,077 S | 7/2008 | Addink | |
| D582,274 S | 12/2008 | Vogel | |
| 7,472,966 B2 | 1/2009 | Goodman et al. | |
| 7,478,723 B2 | 1/2009 | Spater et al. | |
| D588,975 S | 3/2009 | Spater et al. | |
| D597,837 S | 8/2009 | Stuart | |
| D618,608 S | 6/2010 | Fleck | |
| D619,526 S | 7/2010 | Fleck | |
| 2003/0107260 A1 | 6/2003 | Ording et al. | |
| 2005/0183973 A1 | 8/2005 | Spater et al. | |
| 2005/0206220 A1 | 9/2005 | Polka | |
| 2006/0158020 A1 | 7/2006 | Dagh et al. | |
| 2007/0200421 A1 | 8/2007 | DoVale et al. | |
| 2008/0230576 A1 * | 9/2008 | Arabadjis | 224/42.2 |
| 2011/0101767 A1 | 5/2011 | Fleck | |

FOREIGN PATENT DOCUMENTS

| | | |
|---|---|---|
| DE | 500213 | 5/1930 |
| FR | 396797 | 4/1909 |
| JP | 59-192675 | 11/1984 |
| JP | 62157803 A * | 7/1987 |
| WO | WO 00/54991 | 9/2000 |

OTHER PUBLICATIONS

U.S. Appl. No. 13/399,632, filed Feb. 17, 2012, Fleck.
International Search Report and Written Opinion, PCT/US2007/078155, dated Jun. 11, 2008, 7 pages.

* cited by examiner

WHEEL COVER WITH WINDOW FOR OVER-THE-ROAD TRUCKS, TRAILERS AND THE LIKE

This application claims benefit of provisional patent application 61/026,017 filed 4 Feb. 2008, and is a continuation in part of PCT application PCT/US07/078,155, filed with the US Receiving Office on 11 Sep. 2007, which PCT application claimed benefit or provisional patent application 60/843,726, filed 11 Sep. 2006. The subject wheel cover is an improvement over the assembly shown in the above-mentioned copending Patent Cooperation Treaty PCT/US2007/078165, which PCT application, unless specifically described otherwise, is hereby incorporated by reference.

The subject innovation deals with streamlining of motor vehicle wheels, in particular large wheels having what is called a "drop center" construction typically used on large, heavy-duty trucks such as long haul tractor-trailer trucks for interstate and long distance hauling as well as used on city, school, and interstate passenger buses. U.S. Pat. No. 5,135,289 by Fleck et al. details a mounting system for a rigid disk shaped wheel cover to fill the cavity or void formed by the deeply recessed inner surface of the outward facing side of such large truck wheels.

SUMMARY

A streamlining cover is attached to an attachment assembly by a peripheral zipper as disclosed in the referenced PCT documents. This improvement comprises a centrally located transparent window affixed to the zipper attachment. The window has an interior flap for retaining a display card on the inside surface of the transparent window portion, the outermost edge of the streamlining cover includes a flap which overlaps substantially all the circumferential fastener, which is preferably zipper.

BRIEF DESCRIPTION OF THE ADDED FIGURES

FIG. 1 shows a typical large motor vehicle wheel being prepared to receive the attachment device in the wheel covering method of this disclosure.

FIGS. 2 and 3 respectively are the front plan and side views of the preferred wheel covering device.

DETAILED DESCRIPTION

Referring to the figures, the typical motor vehicle wheel 11 to use and benefit from the disclosed method and device for streamlining etc; is sized to receive a conventional tubeless tire in a variety of sizes such as those having a bead diameter of 17.5 inches, 19.5 inches, 22.5 inches, or 24.5 inches. These motor vehicle wheels have an inwardly facing, slightly tapering cylindrical cavity with a diameter that is correspondingly smaller than the corresponding bead size. For example, the 24.5 inch wheel has a tire-mounting rim with an interior diameter of about 22.5 inches. The interior surface of the wheel terminates on its inner circular end with the bolt ring or "wheel face" for attaching the wheel to the motor vehicle running gear, and at its outer end at the outer bead mounting rim. This hollow cylinder has typically an inwardly protruding boss or "drop center" 30 positioned between the tire bead engaging portions of the rim, typically about halfway between the outwardly facing rim of the wheel and the wheel face. Thus, this drop center has an inner diameter less than the inner diameter of the wheel at the outer rim and at the wheel face. An exposed drop center construction is almost universally provided on current-day tubeless truck wheels. The primary purpose of this reduced diameter region of the wheel rim is to provide a location on the outwardly facing circumference of the wheel that has a smaller diameter than at the rim portions of the wheel where the tire beads will ultimately seat for the sealing bead of the tire to drop into when the wheel is being mounted onto or removed from the wheel rim.

Figure 10:
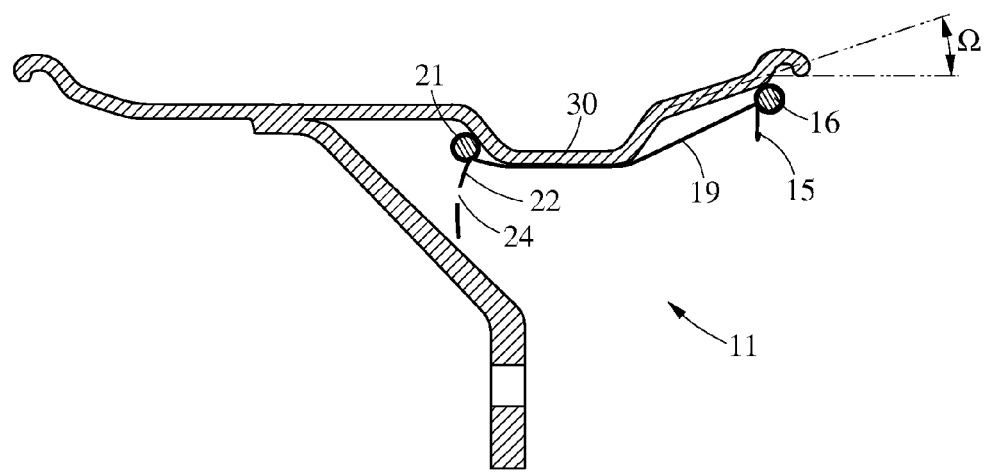
FIG. 10 is a cross section taken along line 10-10 of FIG. 9, showing a typical drop center wheel and the installed attachment system.

The depth of the hollow cavity formed in the wheel is slightly less than the width of the rim portion of the wheel. For large tractor-trailer trucks such wheels have a "bead to bead" width of about 8.25 inches although narrower wheels, such as those for motor homes may have only a width of about 6.75 inches. Such wheels may have differing locations for the drop center or boss portion. Also the inner surface diameter of these wheels may taper slightly at about a fifteen-degree rate from the outer rim to the drop center at the inner portion of the wheels (Shown as angle Q in FIG. 10 for example).

The disclosed innovation uses this drop center or other boss that projects inwardly from the circumferential wall of a truck wheel to help position and hold the attachment system 12 for the device in place. The attachment system 12 consists of an inner ring 21 and an outer ring 16. Each of these rings consists of a flexible but generally rigid and resilient hoop of resilient stainless steel wire. The spring steel wire from which these rings may be made has approximate cross-sectional diameter of between 0.100" and 0.250," preferably about 0.123". The diameter of each hoop or ring should correspond to the diameter of the inner surface of the truck wheel where the ring will be positioned when holding the device 10 in place on the truck wheel 11. Thus if the inner diameter of the wheel is 20 inches then the outer diameter of the ring or hoop of steel wire should also be about 20 inches. The steel ring 21 preferably includes at least one and preferably two V shaped notches or kinks 25. As illustrated in the figures, this kinked portion 25 jogs around the air filler valve stem that is usually positioned between the face of the wheel and the drop center or such relatively smaller diameter portion of the wheel cavity. This kink is where the ends of the spring steel wire are attached together, preferably by inserting these ends into an appropriately sized, V-shaped tube and attached to the wire ends by crimps 26, or otherwise fastened together in a way that will not permit them to come apart under normal operating conditions.

These two rings are interconnected with on or more strips of a flexible laminar material, which strip or strips are permanently sewn to the rings 16 and 21 and extend over the drop center or boss portion of the wheel when the attachment system is properly installed. In the figures, this material is a polyvinyl chloride coated textile typically used for inflatable watercraft, truck tarps, or the like. This material is very durable and yet can be cut and sewn like many industrial textiles. This material lends itself to being folded over and sewn to each of the rings as shown in the figures. The dimensions for this annular strip of coated textile are critical. It should be wide enough to form the flexible connection 19 as shown to accommodate the drop center, yet position the outer ring 16 snugly within the corresponding outermost tapered portion of the truck wheel near the outer tire engaging rim of the wheel. This width dimension of 19 is critical to the self locating or self centering function of the disclosed cover device. The width of the flexible connection 19 is determined in part by the finished width of the flexible material sewn between the rings 16 and 21. This dimension should be consistent around the entire circumference of the attachment system. It should be just long enough to place the outer ring 16 at the outermost edge of the tapered portion of the wheel cavity when the connection 19 is pulled between the inner or second ring 21 and is pulled tightly against the drop center. Thus, the second ring serves as an anchor held against the inward facing surface of the drop center or other reduced diameter portion of the wheel to be covered, while the flexible connection 19 precisely controls the spacing between the second ring and the ring 16 and thus the cover 13. So, when properly dimensioned, the attachment system 19 permits the cover portion to center itself on the tapered portion of the wheel, even after it may become dislodged slightly from its ideal centered position on the wheel.

The surface contact between the wheel's inner surface and the lamina 19 connecting the two rings over the drop center is likely of particular importance. The greater the area of contact, the more secure the mounting. The frictional engagement between the attachment system 12 and the wheel 11 may be enhanced by using a material coating with a high coefficient of friction such as rubber, synthetic rubber, and the like. To further compliment the integrity of the mounting system, oval-shaped cutouts 20 permit the strip or strips of the flexible lamina 14 to conform to the smaller diameter of the drop center portion of the wheel 11, yet be firmly sewn to all or almost all of the circumferences of the steel rings 16 and 21.

Figure 13:
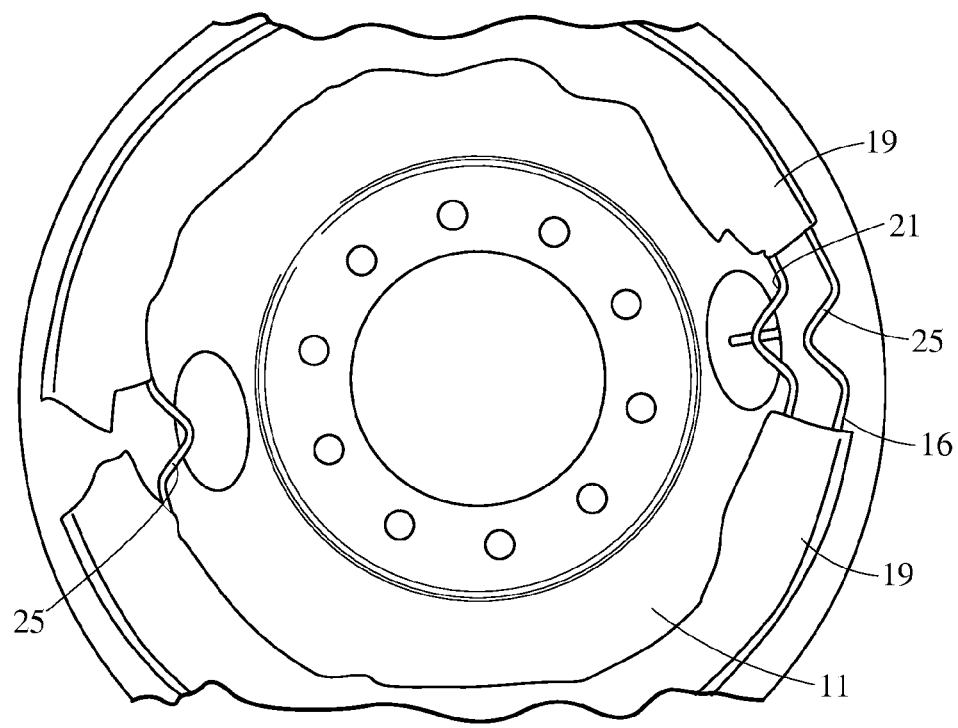
FIG. 13 shows an alternative construction of the attachment portion.
Figure 14:
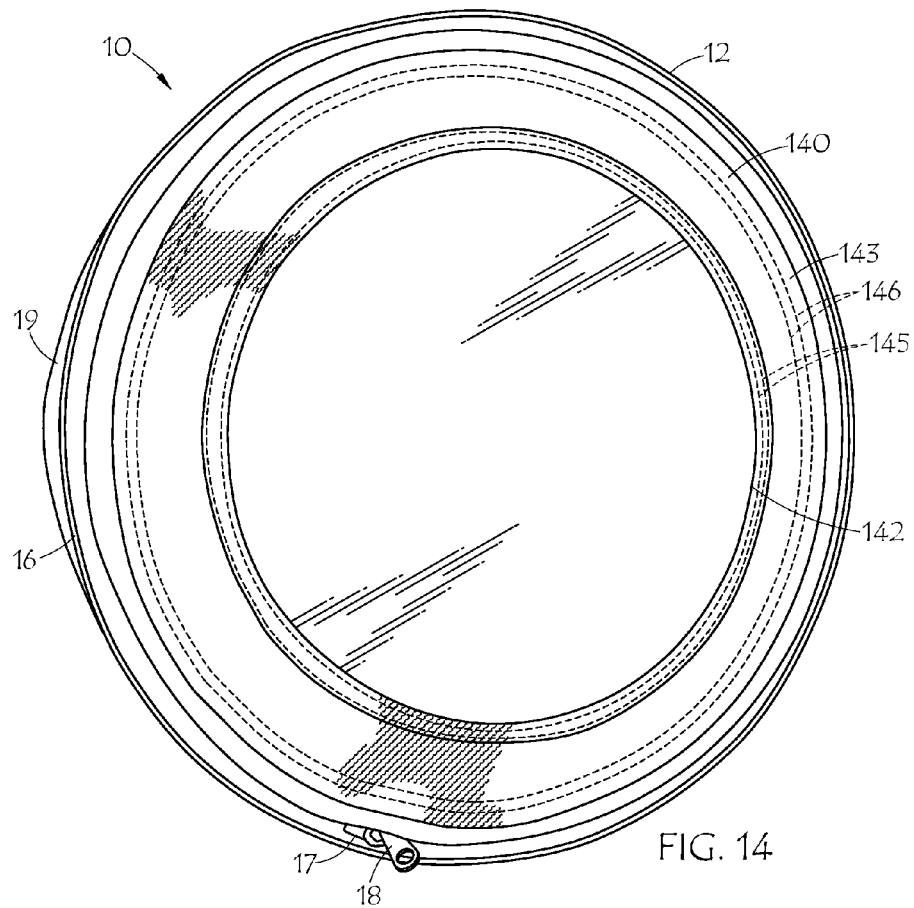
FIG. 14 shows an overall view of the improved wheel cover assembly comprising a cover portion and an attachment assembly (seen projecting beyond the left edge of the cover portion) with a display card with graphic indicia installed inside the transparent window.

In an alternate embodiment, this continuous annular strip of textile material can be replaced or supplemented by several (between 8 and 12) hook and loop fastener strap pairs which extend between the inner and outer rings. Preferably, the inner spring steel ring would have a series of "D" rings positioned to receive conventional hook and loop cinch straps sewn to the outer ring. This hook and loop fastener scheme permits more precise dimensioning of the distance between the inner and outer ring and thus is more versatile because it accommodates wheels having various axial dimensions, or having their drop center portions of differing circumferences and at different distances from the outermost ring engaging edge of the wheel rim. A simpler alternative to the preferred construction is shown in FIG. 13, where the flexible lamina is provided in two strips, each extending between the first notch 25 (constructed of the crimped tube 26 as detailed above, and a second notch 25 formed in the wire ring.

Whether or not the inner and outer rings are connected with flexible lamina and/or adjustable straps, the outer ring 16 includes a sewn attachment to one track of an industrial strength zipper 15. This zipper extends around the entire circumferences of wheel and as sized to accommodate the corresponding zipper track, which in turn is attached to an outer periphery of the disk wheel cover 13.

Figure 1:
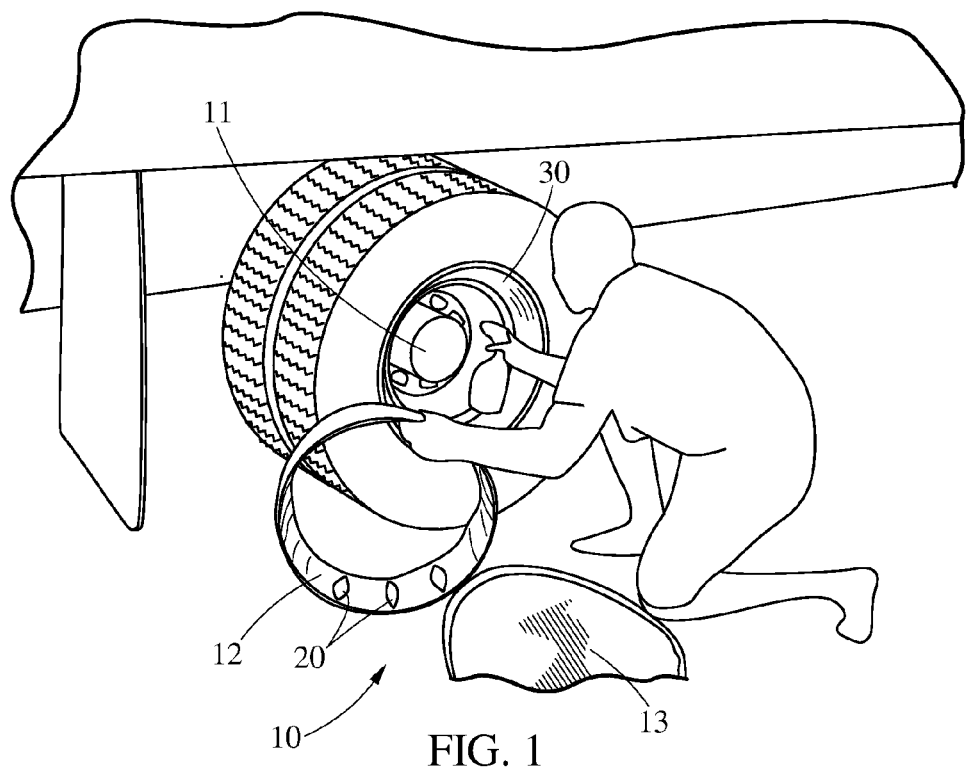
Figure 6:
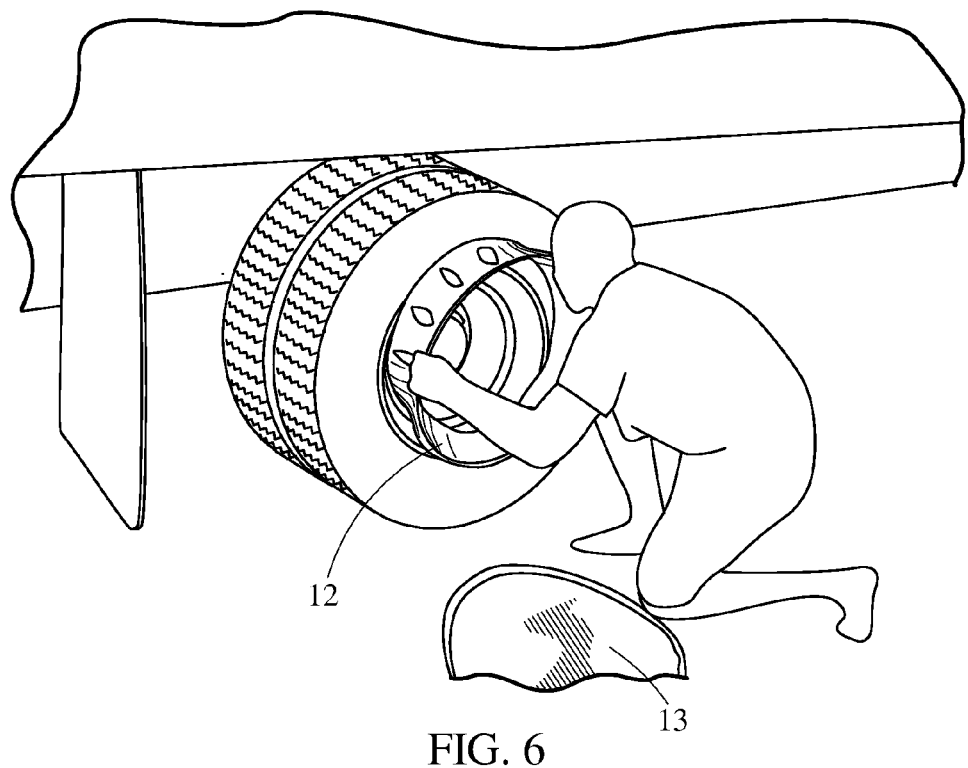
FIG. 6 shows the attachment portion being positioned within the cavity of the motor vehicle wheel.
Figure 2:
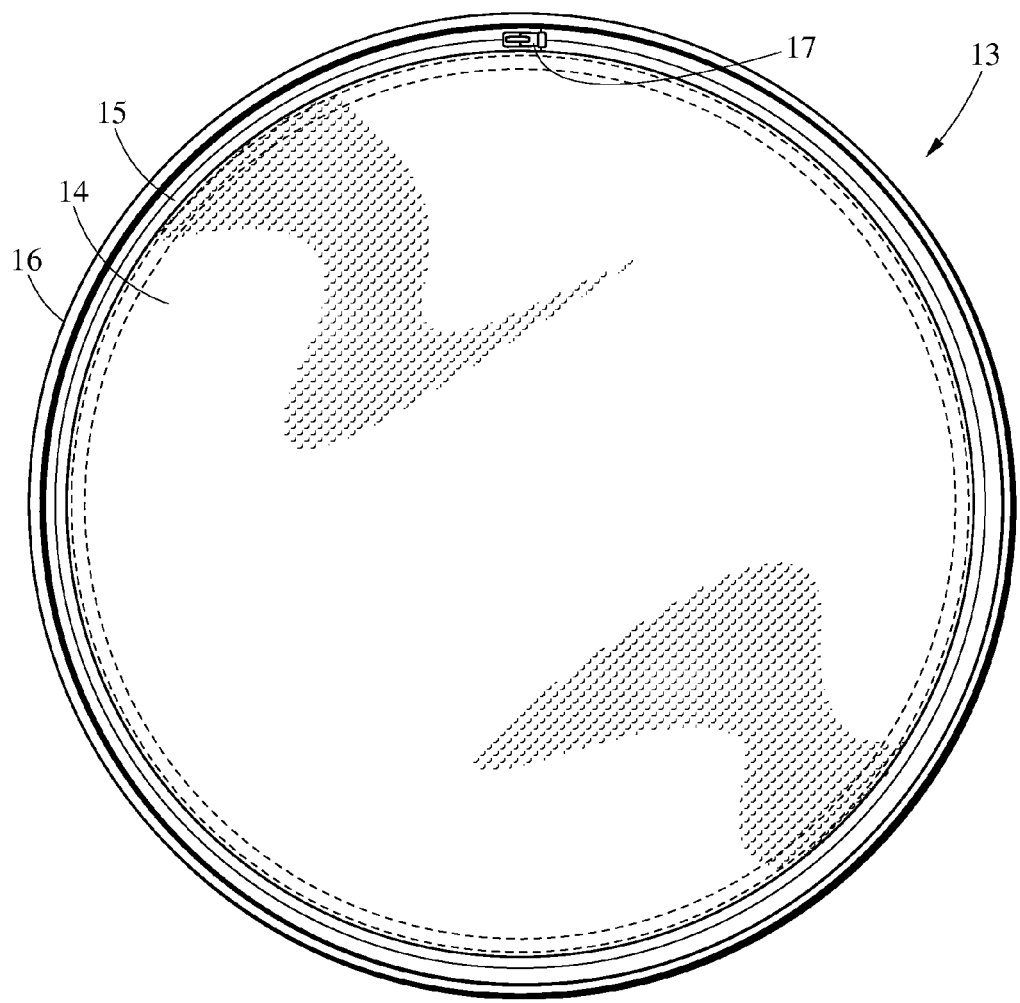
Figure 3:
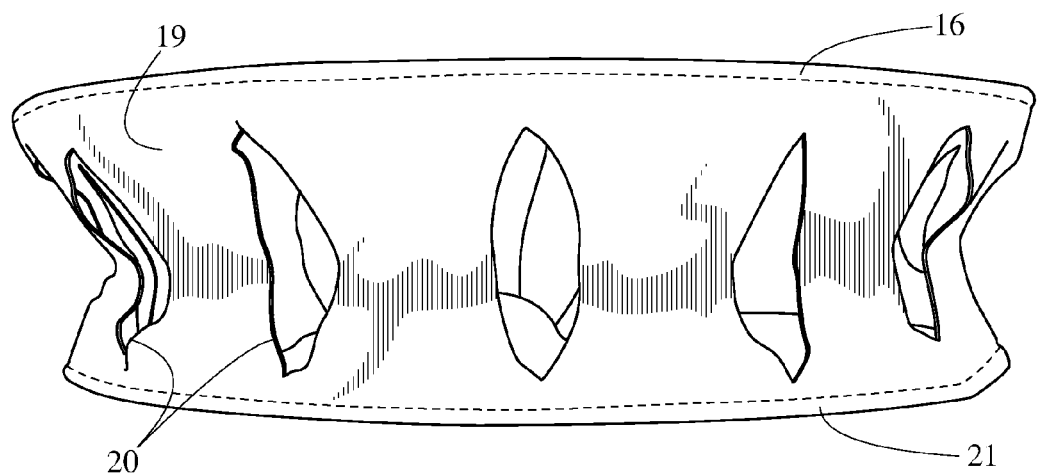
Figure 4:
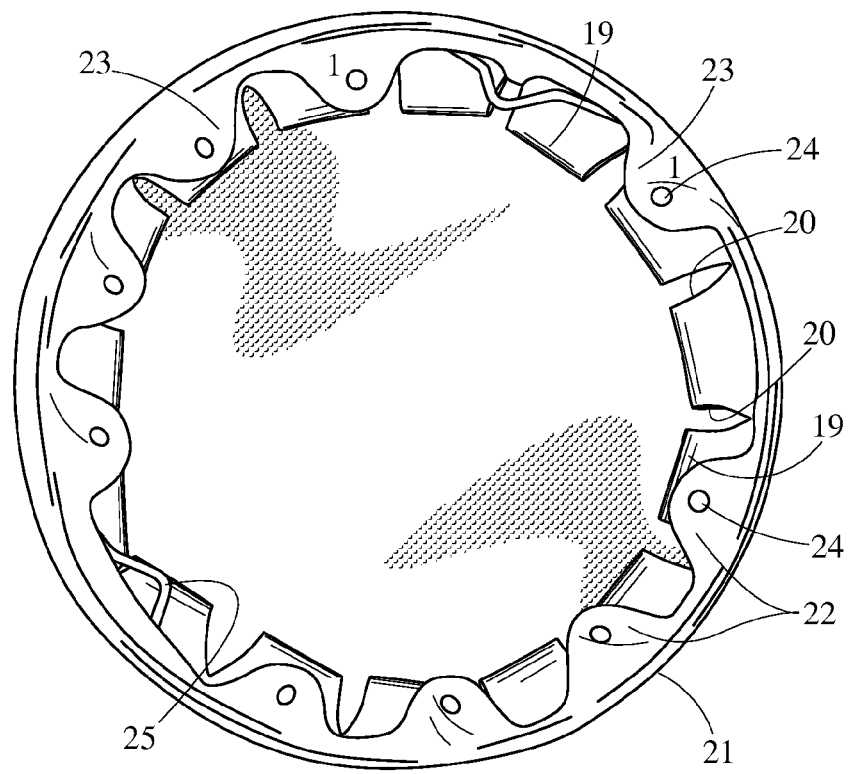
FIG. 4 is a rear plan view of the wheel covering device.
Figure 5:
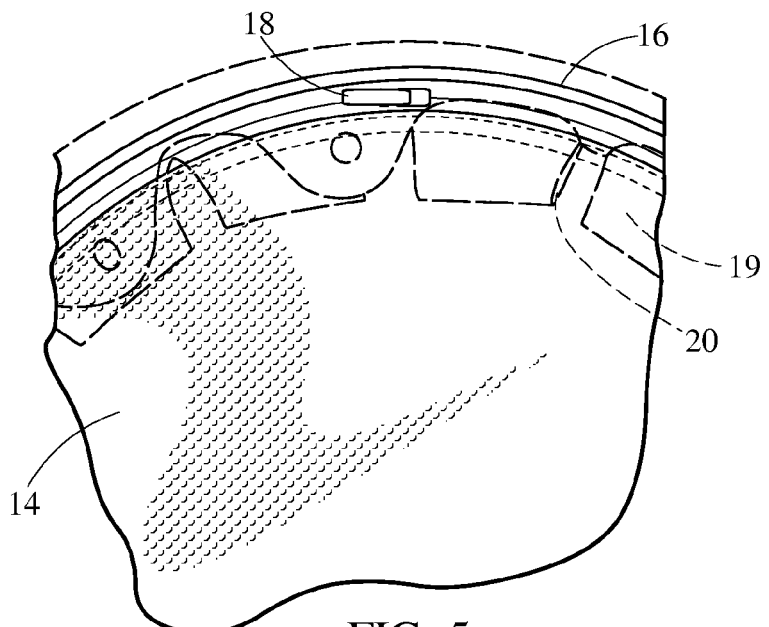
FIG. 5 shows a detail of FIG. 4 with the attachment portion shown in dashed lines.

FIG. 2 etc., shows this zipper track sewn into the outer edge of the flexible lamina 14 that encases the outer ring 16. The zipper track extends slightly more than 360 degrees around this outer ring so that the start and end of the zipper track overlaps slightly (see FIGS. 2 and 5).

Figure 7:
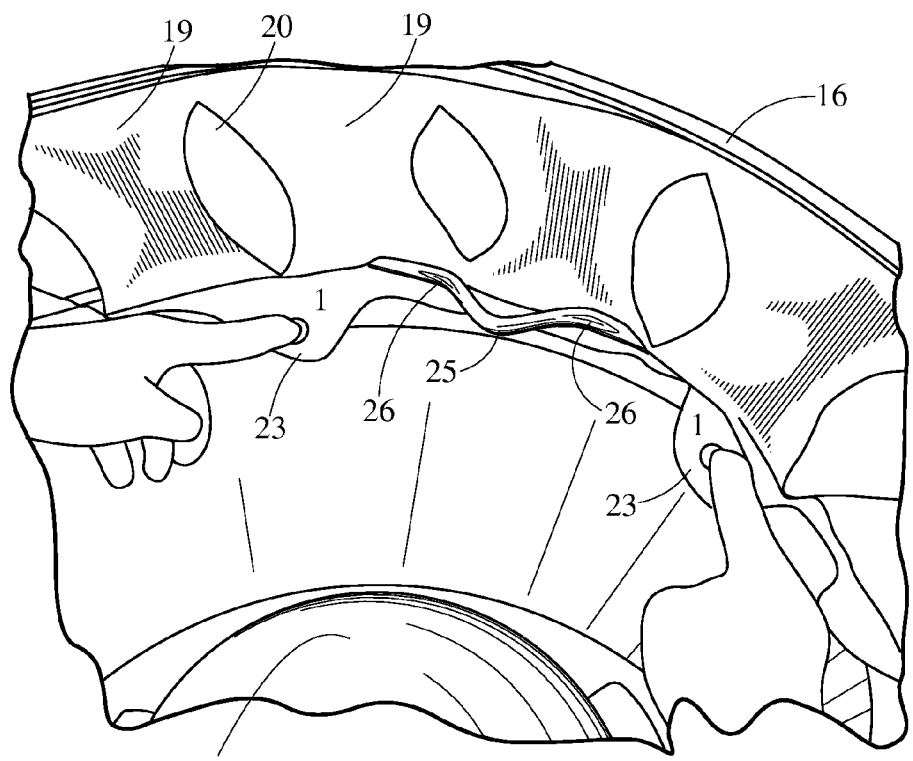
FIG. 7 shows a detailed view of a positioning step according to the method.
Figure 8:
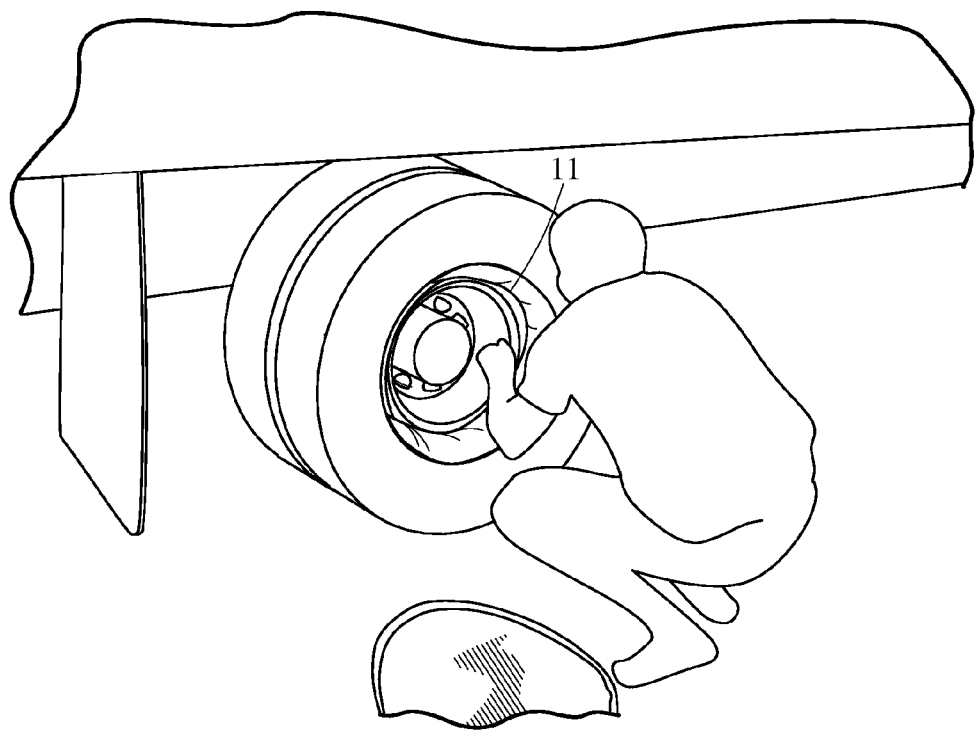
FIG. 8 shows the attachment portion properly positioned within the cavity of the wheel.
Figure 9:
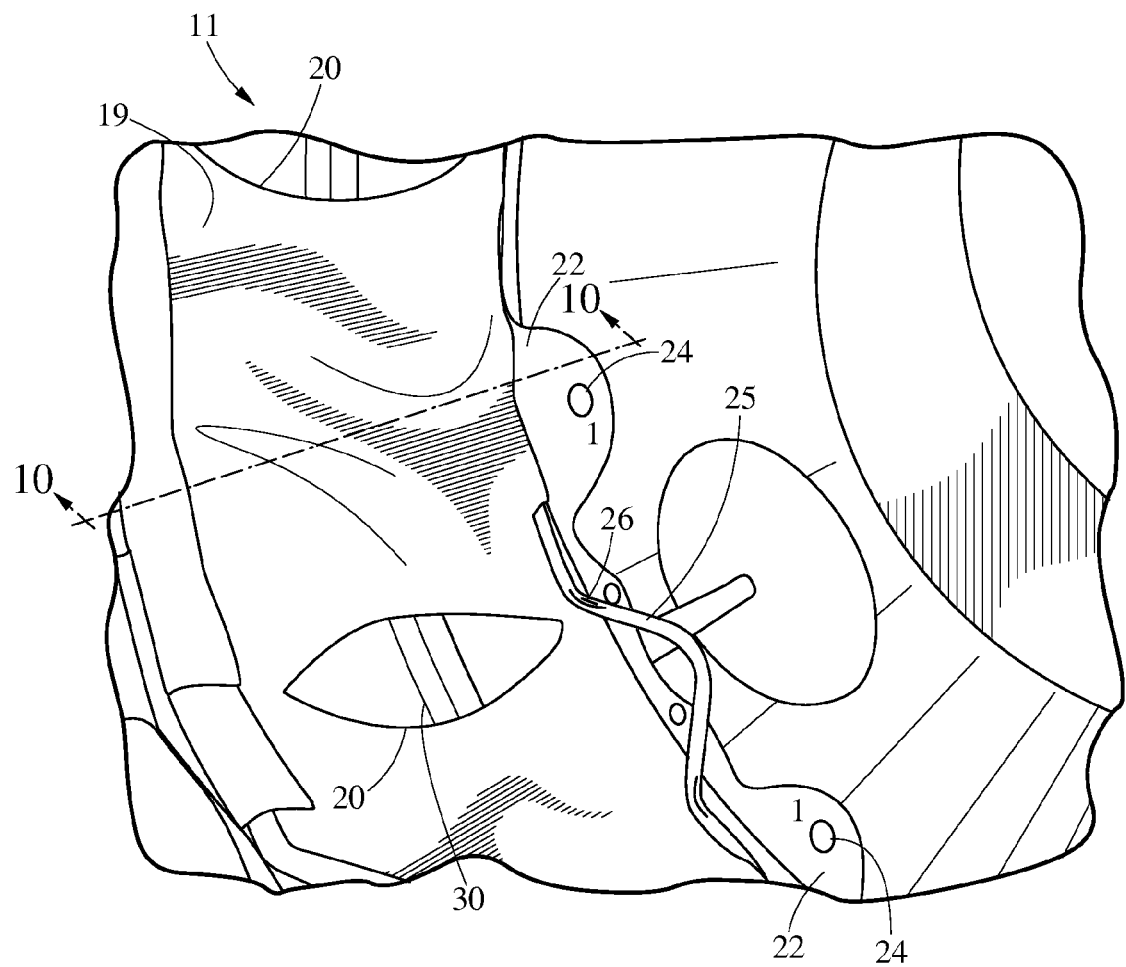
FIG. 9 is a close-up of the attachment portion in position within the wheel cavity.

FIGS. 1 and 6 through 10 illustrate steps in the process of closing the open cavity in the wheel used to carry a long-haul truck or tractor trailer, including the steps of mounting the attachment system 12 within the cavity of the wheel 11 and fixing the wheel cover 13 to the attachment system. First, the attachment system and cover are unzipped from one another. Like any zipper connection, the subject attachment continues from fitting the tab of the zipper into the corresponding portion of the zipper slider 17, and the slider is moved along the corresponding zipper track by pulling tab 18 until the wheel disk is attached as shown in FIG. 7.

Figure 11:
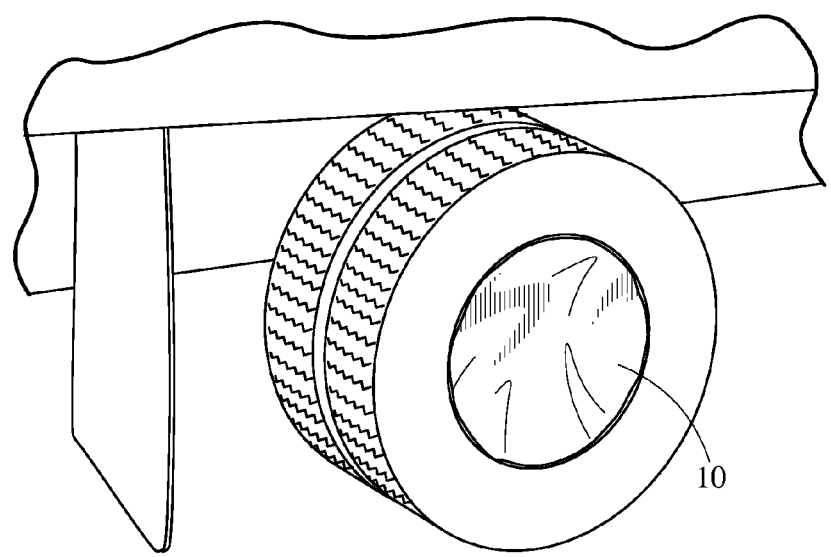
FIG. 11 shows the disk shaped lamina in an attached position on the wheel covering the cavity of the wheel.
Figure 12:
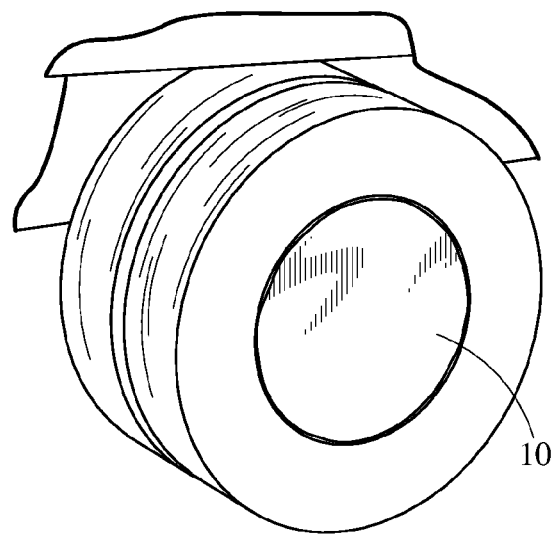
FIG. 12 shows the assembled streamlining flexible disk with the motor vehicle and its wheel moving at high velocity on a test run.

FIG. 11 shows the completed streamlined long-haul tractor trailer or truck or motor coach wheel. The cover portion itself should be similarly durable textile material to that 19 shown connecting the rings 16 and 21. In this particular case the material of choice is a polyvinyl chloride coated textile of the type described above. As a result of this overall textile construction, the overall weight of the finished streamlining wheel cover is remarkably low. Since the textile is inherently weather resistant and quite durable, it can withstand the rigors of road travel quite well, but still perform the function of reducing the overall wind resistance of the wheel cavity when the wheel is moving at velocity down the highway, decorating the wheel, or preferably the several wheels, providing advertising space, and the like. FIG. 13 shows the streamlining cover as it functions to reduce the wind resistance and drag relative to an uncovered drop center wheel. The cover likely forms a barrier—isolating the low pressure of the wheel cavity from the high pressure environment of the air rushing by. Ideally, the cover would be as aerodynamic as possible although simply isolating the two atmospheres of differing pressures should have beneficial effect to the overall drag reduction function desired. If a flatter or convex wheel cover is desired, a rigid or inflatable support may be positioned at or around the central axis of the truck wheel cavity to hold the generally flexible wheel disk in a more aesthetically desired or aerodynamically desired shape. It should be understood that a disk of foamed polymer could be substituted for the preferred textile material, so long as the substitute material had the light weight and flexible characteristics taught herein. Also, while a zipper attachment between the mounting assembly and the streamlining disk is the preferred way of assembling, other secure systems could be used, such as a paired hook and loop fastener strips, lacing systems using eyelets or speed lacing lugs, or other strong, generally continuous attachment scheme.

FIG. 13 provides a more detailed view of slightly alternative attachment portioned construction. First, two generally rigid wire rings are shown, the first shown on the left include two kinked portions, one of which comprises a tubular metal connection to hold the two ends of the single length of spring steel wire which is used to form the resilient ring. This ring also includes a kinked portion 180 degrees opposite from the attachment to the combination of these two kink portions provides a good degree of flexing but still does not compromise the overall resilient but firm connection between the ring and the inner facing surface of the wheel. The other ring to the right does not include the extra kinked portion but does have the tubular portion including the kink at one location on its diameter. These two rings or similar rings are shown attached to the flexible textile strips that holds the two rings to either side of the drop center. This is illustrated by the typical motor vehicle wheel shown just above those exemplary rings. FIG. 13 shows in detail how these rings are positioned along and around the central wheel cavity. Note that the textile strips do not need to extend entirely around the inner circumference of wheel. Rather, the two strips are interrupted only at the kinked portions of the rings, but help position the rings precisely to either side of the drop center. It could be that any interruptions, slits, hook and loop straps, etc., spanning the two rings should be angled to take advantage of the possibility that the outer ring, with the greater rotational inertia of its attached laminar disk, will be more likely to slip relative to the wheel surface during hard braking by the motor vehicle. If the slits, interruptions, or straps are angled relative to the axis of rotation such that they tend to cinch the two rings towards one another, the frictional engagement would increase as engaging force of the material spanning the drop center increases.

FIG. 13 also shows the kinked portions aligned to each other at the same radial position, that radial position is defined by the air valve stem.

The method of using the disclosed device will now be detailed. referring to the Figures, the first step in the preferred method it to clean and lubricate the inner surface of the wheel cavity, especially the drop center with a spray of water. this reduces the grit that could abrade the flexible connection and other parts of the disclosed device, but also reduces friction so that the inner ring 16 can be pulled through the smaller diameter of the drop center more easily using the pull tabs 22. The installer reaches through the opening of the outer ring and zipper track 15, and grabs the two pull tabs 22 marked with the number "1" lining them up to straddle the filler valve. The holes 24 provide convenient grips to help the installer pull the ring into its initial position at the filler valve. Then, working with the next tabs out from these two marked with "1", the ring 21 is pulled through the drop center diameter until it comes to rest in the annular valley between the drop center and the wheel face. Any slight radial adjustment of the ring 16, the connection 19, and the second ring should be done now while the wheel surfaces are still wet and slightly slippery.

Once the attachment system is in place and adjusted, the cover 13 is zipped onto the zipper track 15, thus closing the access to the attachment system and closing of course the wheel cavity. Any slight misalignment of the outer ring relative to the tapered portion of the wheel will usually go away during the initial few kilometers of over the road travel due to the self centering operation of the attachment system as discussed above Once the basic idea of a flexible attachment and generally flexible wheel disk is understood, variations become clearly obvious. For example other attachment schemes besides a circumferential zipper might be contemplated for particular applications. For example one could merely provide an access port or slit through the wheel disk. This would permit the installer to manipulate the inner and outer rings and to adjust the hook and loop fastener straps between the two rings without having to completely dismount the disk from the attachment assembly. This slit could extend only partially across the center of the wheel disk or entirely across the center of the wheel disk in a single straight line, so long as it is large enough to permit the hand or hands of the installer to access the inner and outer rings, to locate the ring's kinked portions relative to the valve stem, and to inspect the wheel and the proper positioning of all of the parts of the streamlining disk assembly during installation and during use.

The disk portion of the streamlining assembly lends itself to advertising copy, graphics and the like. The textile material used to make the disk could be treated to receive conventional automotive paints and other finishes so that the disk portion could be coordinated with the aesthetics of the motor vehicle.

Alternatively company logos could be applied to the disk using conventional silk screening or printing techniques.

Also, it should be clear from this disclosure that other ways to hold the generally stiff, resilient, springy rings on each side of the drop center portion are contemplated herein. For example, the rings could be completely or partially enclosed in injection molded shapes. These shapes could include attachment loops to receive flexible straps, laces, or cords to cinch the rings across the drop center portion. Such molded shapes could also include high friction materials and surfaces to help prevent relative circumferential slipping during braking or other environmental forces as mentioned above. Variations on the disclosed closing or streamlining device 10 and its method of mounting and use become immediately apparent For example, the preferred device uses a strong zipper to form a releasable connection between that attachment system 12 and the cover portion 13. Thus, the cover portion can be completely removed during installation, and the portions 12 and 13 could each be replaced or refurbished as needed while the remaining portions reused. But the essential function of the zipper 15, that is to provide manual access to interior cavity of the wheel 11 for pulling the attachment system into position or for its removal, for adjusting tire pressure, or for visual inspection of the device 10 while in place in the wheel or for visually inspecting the wheel or the truck hub to which it is attached could be accommodated by a shorter zipper (or some other releasable fastener system known in the art) that only goes partially around the circumference of the cover, or goes across only a center portion of the cover 13. For example, a slit through the cover 13 sized to permit a person's hand or hands to pass through to the wheel cavity could cut across the center of the wheel. This slit could be closed by a short zipper, hook and loop fasteners of known type, lacing, etc. Such a modification may not have the advantages provided by the preferred system detailed above, such as full access to the entire attachment system, permitting the rings to flex during installation without being constrained by the cover, and providing interchangeable or multiple covers for a single attachment system.

The beneficial effects of providing a shaped cover to close off motor vehicle wheel cavities have been shown. It is easy to see additional benefits when one considers that over the life of a typical tractor-trailer truck, fuel cost alone can be a staggering burden, equaling if not exceeding the initial capital cost of the truck. For example, if such a truck traversed 110,000 miles a year over seven years fuel cost (currently at around $3.00 per gallon for diesel fuel) could amount to 70% of the cost of ownership. Thus any appreciable reduction in fuel expenditures could easily pay for the cost of these remarkably efficient and cost effective wheel covers. Initial tests under controlled conditions indicate that fuel savings for between about 0.975% and 2% could be expected as a result of using the disclosed wheel cover system and method, depending on the number of wheels covered, location of the wheels covered, and driving conditions.

Figure 15:
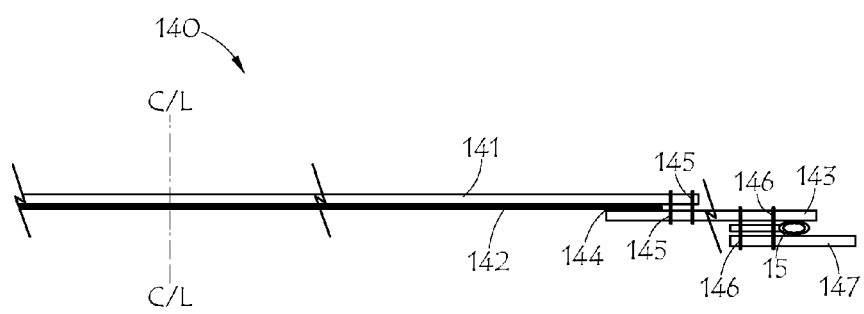
FIG. 15 is a partial cross section view of the wheel cover assembly of FIG. 14 showing the major structural portions thereof, including the inwardly facing face and outer face of the transparent window in profile.
Figure 16:
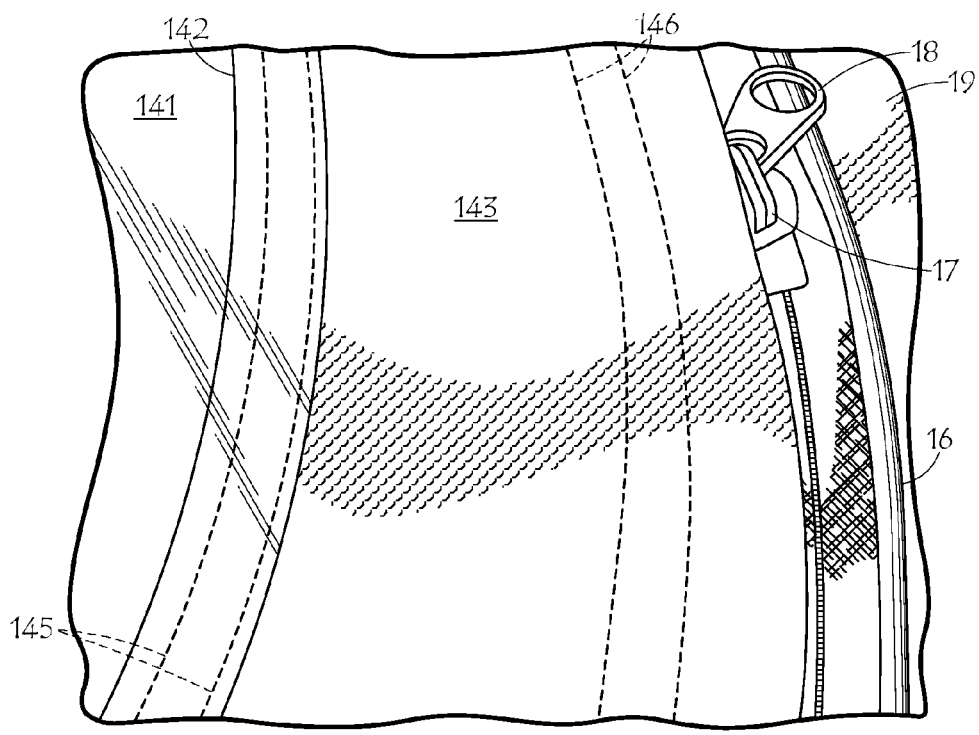
FIG. 16 is a detailed perspective view of a typical outer circumference portion of the wheel cover shown in FIG. 14.
Figure 17:
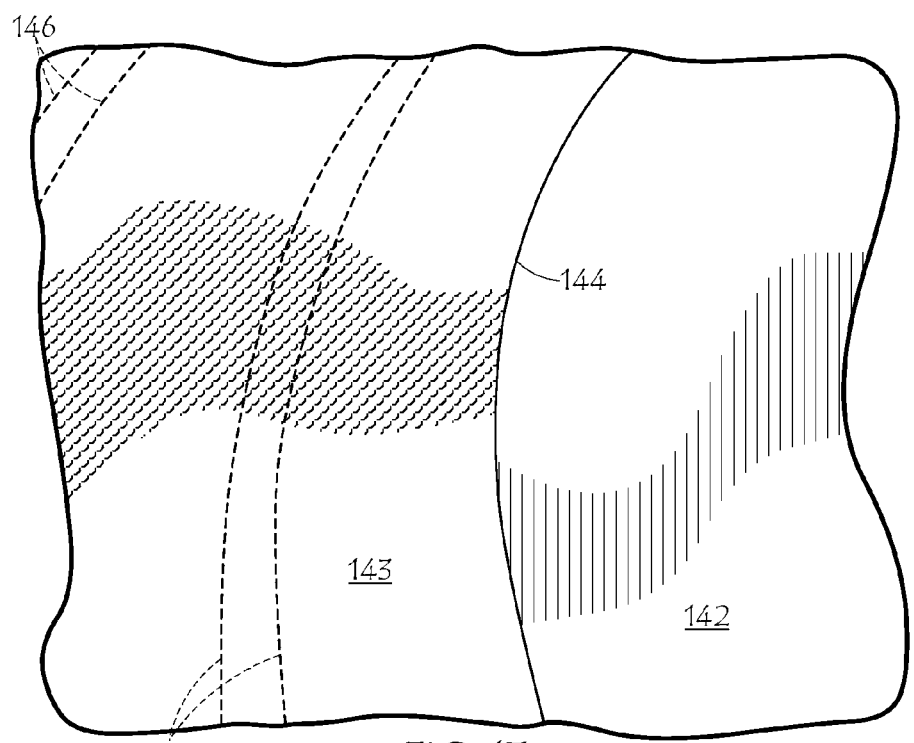
FIG. 17 is a perspective view of a portion of the outer circumference of the wheel cover as seen from the inside, that is the side normally facing the vehicle wheel covered thereby.
Figure 18:
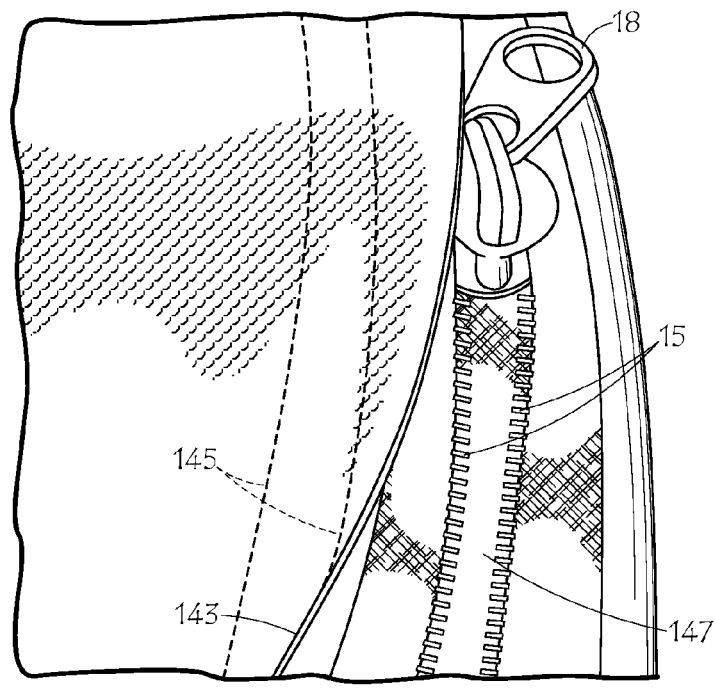
FIG. 18 is a detailed view of the integrally formed flap that normally covers the outwardly facing surface of the manually operable connection in the form of a circumferential connection or zipper.
Figure 19:
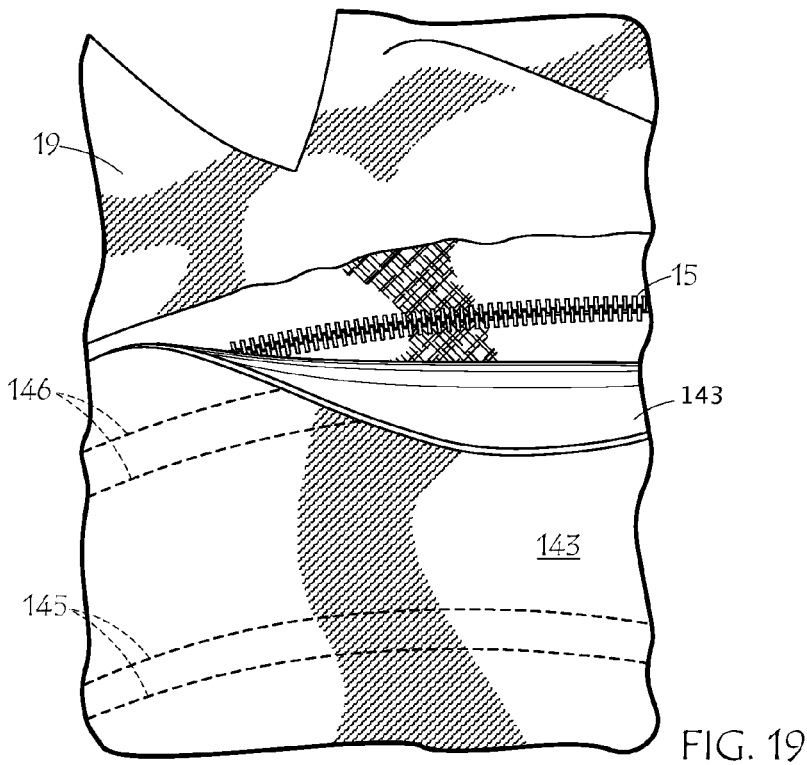
FIG. 19 is a detailed view of a portion of the inwardly facing side (or the side facing the vehicle wheel to be covered) showing inner integrally formed flap that normally covers the inside surface of the circumferential connection or zipper.

The embodiment illustrated in FIGS. 14 through 17 permits graphic information carried by the wheel cover assembly to be changed by merely inserting or changing a display card carried by and protected by the wheel cover assembly. The cover portion 140 includes a circular "window" portion formed of a transparent portion 141 made of a flexible transparent laminar vinyl material about 1 mm thick. This circular window is stitched to an annular portion 143 of reinforced textile material as generally disclosed in the parent PCT application. This annular portion overlaps the inside circumference of the window portion 141 by about 3 cm to form a circumferentially extending flap 144 that holds a circular display card 142 against the inward facing face of the window portion 141 as seen in FIG. 15. The display card 142 can include indicia such as advertising, instructions, and/or a decorative graphic and is made of a conventional paper card stock about 0.5 mm thick. The display card 142 can be inserted between the flap 144 formed by the annular space between the innermost edge part of the annular portion 143 and the circumference defined by the stitch lines 145 and 145 that affix the transparent flexible polymer portion 141 to the annular portion 143. The outermost edge of annular portion 143 overlaps the zipper track 15, which normally holds the cover 140 to the attachment portion. Circumferential stitch lines 146 and 146 pass through the zipper tape portion of the zipper and hold it in place.

At the outermost circumference of the cover 140, a further annular member of reinforced textile 147 is also stitched to the zipper track by stitch lines 146 and 146 and extends further radially outwardly. This member 147 forms another gland seal to reduce the tendency of the teeth of the zipper to accumulate dirt during road travel.

The display card 142 is preferably circular as stated above and can be inserted between the centrally mounted, circular window 141 and the flap formed between inner edge 144 and the stitching 145. Alternatively, this display card 142 can be eliminated so that the wheels streamlined by the disclosed construction can be inspected without operating zipper 15.

Note that the sealing flaps formed by members 143 and 147 face radially outwardly. This takes advantage of the centripetal force on these flexible portions when the vehicle is rolling at typical highway speeds on the thus covered and decorated wheels having the disclosed wheel cover assembly mounted thereon. The centripetal force thus tends to throw the dirt and water clinging to the cover radially outwardly as well as help to hold these overlapping flap members against the teeth of zipper 15, further enhancing the dirt-excluding function of these portions of the disclosed structure. Similarly, the outermost edge of the transparent window portion 141 faces radially outwardly, thus urging rain, dirt in the like to be shed outwardly away from the seam formed by the stitching 145 and 145. This helps to keep such rain and dirt out from within the covered portion of the wheel, as well as keep the display card 142 relatively free from such dirt and precipitation.

The advantages of the disclosed improved wheel cover assembly are many. First the inner and outer flaps formed by the annular members 143 and 147 reduce the accumulation of dirt and dust on the zipper, reducing the resulting friction and clogging of the zipper slider 17, and facilitating manual operation of the zipper by the pull tab 18, especially after road use. The built-in window 141 as detailed above permits the inspection of the wheel without operating the zipper. In the alternative or additionally, the window permits the operator of the over the road vehicle using the subject cover assembly to display advertising or custom decorative graphics. The vehicle operator can change the display card easily to, for example, promote his or her favorite sports team or the company who contracted for the over the road shipping being carried by the vehicle, etc.

While the flap 144 is shown to comprise of a continuous annular extension of the annular portion 143 overlapping onto the inward facing side or face of the window portion, it is understood that other structures are contemplated which would serve to hold a display card 142 or other media to be displayed on the wheel cover assembly. For example, The flap could be divided into discontinuous portions, such as two, three or four portions spaced around the circumference of the wheel cover. Or, two or more individual tabs of semirigid material, such as polyethylene sheet, could be fastened to the wheel cover to grip the back of the card 142 to be displayed. Strips of such material, or lengths of elastic material could be fastened at each end of their lengths so that the strips extend radially across the window 141 so that a display card or such media would be sandwiched between the window 141 and these attachment aids. Also, while the attachment assembly for holding the wheel cover assembly to the drop center of an over the road vehicle wheel works very well, other attachment systems could work and still take advantage of the disclosed selectively transparent wheel cover portion. For example, in lieu of the zipper track, etc, attached to resilient annular steel rings, etc., detailed above, the attachment assembly could have a series of clips, buckles, or studs directly affixed to or at the outer circumference of the vehicle wheel to which the wheel cover portion can be selectively attached with mating clips, straps or eyelets. Also, while the display card is shown to be circular and continuous, and when in place thus obscuring viewing the covered wheel from view, it is understood that the display card could include apertures or could be shaped to create gaps between the card and portions of the outer periphery of the transparent window. In this situation, both the advertising and decorative aspects of the display card can be had simultaneously with the ability to visually inspect the covered wheel through the unobscured portions of the transparent polymer window portion.

The invention claimed is:

1. A wheel covering device comprising:
    an attachment system adapted to removably engage a wheel cavity; and
    a cover portion removably connected to the attachment system, the cover portion having a transparent window, an outer circumference of the transparent window being connected to an annular portion near an inner edge of the annular portion such that at least a section of the annular portion overlaps at least a section of the transparent window to form a flap extending circumferentially, the flap being adapted to receive a display card for display through the transparent window.

2. The wheel covering device of claim 1, wherein the transparent window has an outer circumference facing radially outwardly.

3. The wheel covering device of claim 1, wherein the cover portion includes a second flap facing radially outwardly, the second flap overlapping a releaseable connection.

4. The wheel covering device of claim 1, wherein the transparent window is substantially circular.

5. The wheel covering device of claim 1, wherein the flap is substantially continuous.

6. The wheel covering device of claim 1, wherein the transparent window is positioned at a center of the cover portion.

7. The wheel covering device of claim 1, wherein the display card is substantially circular.

8. A wheel cover portion comprising:
   an annular portion of a textile material having an inner edge and an outer edge;
   a releaseable connection overlapping the annular portion of textile material;
   a transparent window having an outer circumference connected to the annular portion near the inner edge such that at least a section of the annular portion overlaps at least a section of the transparent window; and
   a flap formed from the section of the annular portion, the flap being adapted to receive a display card for display through the transparent window.

9. The wheel cover portion of claim 8, wherein the flap is substantially continuous.

10. The wheel cover portion of claim 8, wherein the flap extends circumferentially.

11. The wheel cover portion of claim 8, wherein the display card is substantially circular.

12. The wheel cover portion of claim 8 further comprising:
   a second flap formed from a second section of the annular portion extending to the outer edge, the second flap overlapping the releaseable connection.

13. The wheel cover portion of claim 8, wherein the outer circumference faces radially outwardly.

14. The wheel cover portion of claim 8, wherein the transparent window is made of a flexible laminar material and the annular portion is made of a reinforced textile material.

15. An attachment system comprising:
   a first ring connected to a second ring by a flexible connection adapted to engage one or more surfaces in a wheel cavity; and
   a releaseable connection disposed near the first ring, the releaseable connection adapted to engage a cover portion having a transparent window adapted to display one or more display cards, the cover portion being adapted to cover the wheel cavity.

16. The attachment system of claim 15, wherein the releaseable connection is a zipper connection.

17. The attachment system of claim 15, wherein at least one of the one or more display cards is substantially circular.

18. The attachment system of claim 15, wherein the cover portion is substantially disk shaped.

19. The attachment system of claim 15, wherein the flexible connection is a strip of textile material.

20. The attachment system of claim 15, wherein the transparent window is circular.

* * * * *